(12) United States Patent
Riedl

(10) Patent No.: US 8,622,426 B2
(45) Date of Patent: Jan. 7, 2014

(54) HEIGHT ADJUSTABLE SUPPORT FOR SEMI-TRAILERS

(75) Inventor: Reinhold Riedl, Miltenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 325 days.

(21) Appl. No.: 13/000,563

(22) PCT Filed: Jan. 13, 2010

(86) PCT No.: PCT/EP2010/050322
§ 371 (c)(1),
(2), (4) Date: Feb. 7, 2011

(87) PCT Pub. No.: WO2010/084065
PCT Pub. Date: Jul. 29, 2010

(65) Prior Publication Data
US 2011/0266784 A1    Nov. 3, 2011

(30) Foreign Application Priority Data
Jan. 20, 2009  (DE) .................. 20 2009 000 634 U

(51) Int. Cl.
*B60S 9/02*    (2006.01)
*B60R 19/54*    (2006.01)

(52) U.S. Cl.
USPC ............. 280/763.1; 280/766.1; 280/762; 254/418; 254/419; 254/424

(58) Field of Classification Search
USPC ............ 280/763.1, 766.1, 762; 254/418, 419, 254/424
See application file for complete search history.

(56) References Cited

U.S. PATENT DOCUMENTS

| 3,010,699 | A |   | 11/1961 | McKay |       |
|-----------|---|---|---------|-------|-------|
| 3,921,958 | A | * | 11/1975 | Brockelsby et al. | 254/420 |
| 4,402,526 | A | * | 9/1983  | Huetsch | 280/766.1 |
| 6,598,886 | B2 | * | 7/2003 | Baird et al. | 280/6.155 |
| 6,846,016 | B2 | * | 1/2005 | VanDenberg et al. | 280/763.1 |
| 7,083,196 | B2 | * | 8/2006 | Riedl | 280/763.1 |
| 7,240,921 | B2 | * | 7/2007 | Baxter | 280/763.1 |
| 7,258,363 | B2 | * | 8/2007 | Baxter | 280/763.1 |
| 7,380,825 | B2 | * | 6/2008 | Peveler | 280/766.1 |
| 8,051,545 | B2 | * | 11/2011 | Peveler | 29/428 |

(Continued)

FOREIGN PATENT DOCUMENTS

| DE | 8813558 U1 | 1/1989 |
| DE | 10017322 A1 | 10/2001 |
| EP | 1104369 | 1/2003 |

*Primary Examiner* — J. Allen Shriver, II
*Assistant Examiner* — James M Dolak
(74) *Attorney, Agent, or Firm* — Price Heneveld LLP

(57) ABSTRACT

A height-adjustable support for semi-trailers and the like includes a shaft tube body, a slidable support inner tube arranged in the shaft tube and body and having a foot mounted to an end region thereof by a nut located on a spindle which is drivable by a transmission, wherein the transmission has a switchable spur gear region and a beveled gear stage. The shifting region of the transmission comprises a low-gear pinion and a fast-gear wheel, wherein the low-gear pinion is coupled to a drive shaft that can mesh with a low-gear gearwheel, the fast-gear gearwheel is adapted to drive a fast-gear pinion, and wherein the fast-gear gearwheel is coupled to the drive shaft. The drive shaft is supported in an unrotatable and axially slidable manner in a sleeve bearing that is supported rotatably in at least a select one of a bearing block or load bearing base supporting the spindle.

11 Claims, 3 Drawing Sheets

(56) References Cited

U.S. PATENT DOCUMENTS

| | | | |
|---|---|---|---|
| 8,096,529 B2 * | 1/2012 | Muller et al. | 254/419 |
| 8,136,840 B2 * | 3/2012 | Riedl | 280/766.1 |
| 8,157,247 B2 * | 4/2012 | Seidel et al. | 254/424 |
| 8,317,225 B2 * | 11/2012 | Muller et al. | 280/763.1 |
| 8,382,069 B2 * | 2/2013 | Alguera et al. | 254/424 |
| 8,388,023 B2 * | 3/2013 | Birkholz et al. | 280/763.1 |
| 8,408,522 B2 * | 4/2013 | Birkholz et al. | 254/425 |
| 8,469,340 B2 * | 6/2013 | Birkholz et al. | 254/418 |
| 8,500,102 B2 * | 8/2013 | Scott et al. | 254/420 |
| 2001/0020781 A1 | 9/2001 | VanDenberg | |

* cited by examiner

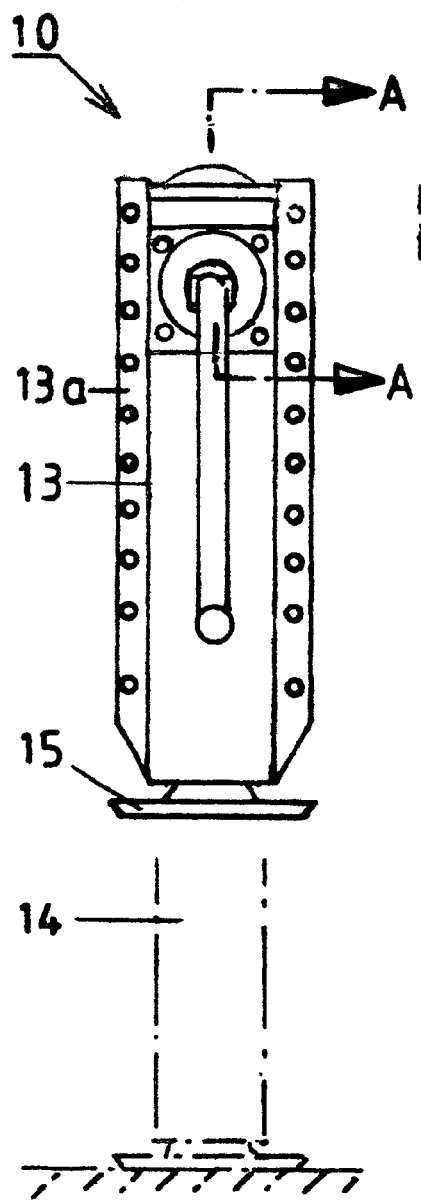
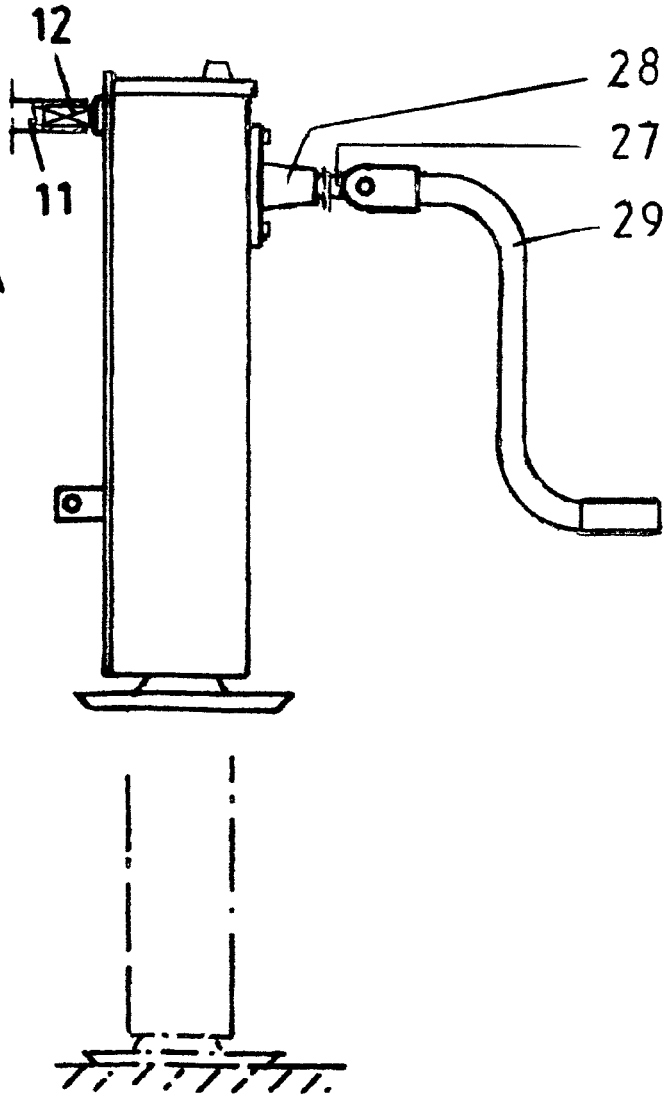
Fig. 1
Fig. 2

HEIGHT ADJUSTABLE SUPPORT FOR SEMI-TRAILERS

BACKGROUND OF THE INVENTION

The invention relates to a height-adjustable support for semi-trailers or the like. Such supports are arranged in pairs in the front region of semi-trailers and, in the fast gear, can be brought into the supporting or transport position and, if necessary, in the low gear, they can be used to lift a partial mass of the semi-trailer.

A generic support is known from EP 1 104 369 B1. Its large-diameter gearwheel for the fast gear is designed pot-shaped and supported in a cap seated on an outer sleeve. At the front face of the support and constructionally below the transmission input shaft, the large gear rim of this gearwheel directly dips into the outer sleeve. Constructionally, this necessitates a substantial shortening of the front wall region of the inner sleeve, resulting in a loss of guiding length between the outer and the inner sleeves, which, in the case of an extreme lifting length of the inner sleeve, leads to a loss of kinking and bending stiffness of the support.

SUMMARY OF THE INVENTION

It is an object of the invention to propose a height-adjustable support for semi-trailers, in which it is possible to change easily and safely between a low gear and a fast gear.

This object is achieved by means of a height-adjustable support for semi-trailers or the like having the features defined in claim 1. Preferred embodiments are defined in the dependent claims.

According to the invention a height-adjustable support for semi-trailers or the like is provided, comprising a shaft tube body that can be fastened to a semi-trailer frame, a slidable support inner tube which is arranged in the shaft tube body and to the lower end region of which a foot is fastened and which support inner tube is connected to a nut located on a spindle, which can be driven by a transmission having a switchable spur gear region and a bevel gear stage, wherein a shifting region of the transmission comprises a low-gear pinion and a fast-gear gearwheel, wherein the low-gear pinion is associated with or arranged on a drive shaft or a pinion coupling part, which can mesh with a low-gear gearwheel, wherein the fast-gear gearwheel can cause the driving of a fast-gear pinion, wherein the fast-gear gearwheel is supported on the drive shaft or the pinion coupling part, respectively, and wherein the drive shaft or the pinion coupling part, respectively, is supported in an unrotatable and axially slidable manner in a sleeve bearing, which is supported rotatably in a bearing block or load bearing base, respectively, supporting or bearing the spindle.

In the support according to the invention the large-diameter fast-gear gearwheel is supported on the drive shaft or a pinion coupling part with drive piece, respectively, which are each supported in a sleeve bearing in an unrotatable and axially slidable manner, wherein the drive piece in turn is rotatable and, like the spindle, is supported in a load bearing base or bearing block, respectively.

According to the invention it is proposed to support the drive shaft or the pinion coupling part, respectively, in an unrotatable and axially slidable manner in a sleeve bearing which, in turn, is supported rotatably in the load bearing base.

Advantageously, the arrangement of the large-diameter gearwheel for the fast-gear operation has no negative influence on its optimal design.

Preferably, the sleeve bearing has at least a longitudinal groove at its inside, into which groove a carrier of the drive shaft or the pinion coupling part, respectively, can be inserted or with which it can engage, respectively.

Advantageously, the drive shaft or the pinion coupling part, respectively, has a bearing journal with at least a carrier, preferably two carriers, which preferably protrude radially.

The sleeve bearing preferably can be provided with longitudinal grooves at its inside into which, for establishing the torsional rigidity with the drive shaft, preferably two radially protruding carriers engage at the end region of the support inner side of the drive shaft.

Expediently, the carrier is designed to mesh with the fast-gear gearwheel after a displacement of the drive shaft or of the pinion coupling part, respectively. Thus, after the displacement of the drive shaft, the carriers of the drive shaft can serve for meshing with the fast-gear gearwheel so as to cause its rotation.

Preferably, the carrier has a width and an arrangement on the drive shaft or the pinion coupling part, respectively, such that at the same time a meshing with the fast-gear gearwheel and the sleeve bearing is made possible. If the width and the arrangement of the carriers are chosen such that simultaneously also a positive meshing with the sleeve bearing is ensured when they are coupled with the fast-gear gearwheel, it is achieved that during the fast-gear operation the sleeve bearing rotates synchronously to the fast-gear gearwheel. This offers the advantage that the shifting from the fast-gear operation is made possible by means of a slight axial displacement of the drive shaft since the carriers can glide within the longitudinal grooves of the fast-gear gearwheel and the sleeve bearing, which grooves are axially aligned in this case.

Preferably, the drive shaft is supported in a flange bearing, which heightwise is located below the drive shaft.

It is also preferred that in the preferably retracted state of the support the lower region of the fast-gear gearwheel protrudes heightwise into the support inner tube.

Preferably, the drive shaft or the pinion coupling part, respectively, is arranged perpendicularly to the spindle.

Expediently, the fast-gear gearwheel is located within the shaft tube body at a distance from its front wall. The fast-gear gearwheel is arranged within the shaft tube body at a distance from its front wall and preferably in its lower region heightwise arranged such that it protrudes into the support inner tube. The fast-gear gearwheel is also supported in the inner region of the shaft tube body. To this end, it is preferably not necessary to cut out the front wall region of the support inner tube, which would reduce its strength.

Preferably, the sleeve bearing is supported in a bearing bore of the bearing block or load bearing base, respectively.

Preferably, the fast-gear gearwheel is designed and supported on the drive shaft such that it can easily be installed and removed vertically without providing a large opening in the front wall of the shaft tube body, or without a lateral displacement being necessary.

Further advantages and features of the invention result from the following description of preferred embodiments, wherein reference is made to the accompanying written specification, claims and drawings, wherein individual features of different embodiments can be combined to from new embodiments.

BRIEF DESCRIPTION OF THE DRAWINGS

FIG. 1 is a front perspective view of a preferred embodiment of the support according to the invention;

FIG. 2 is a side perspective view of a preferred embodiment of the support shown in FIG. 1;

DETAILED DESCRIPTION OF THE PREFERRED EMBODIMENTS

Figure 3:
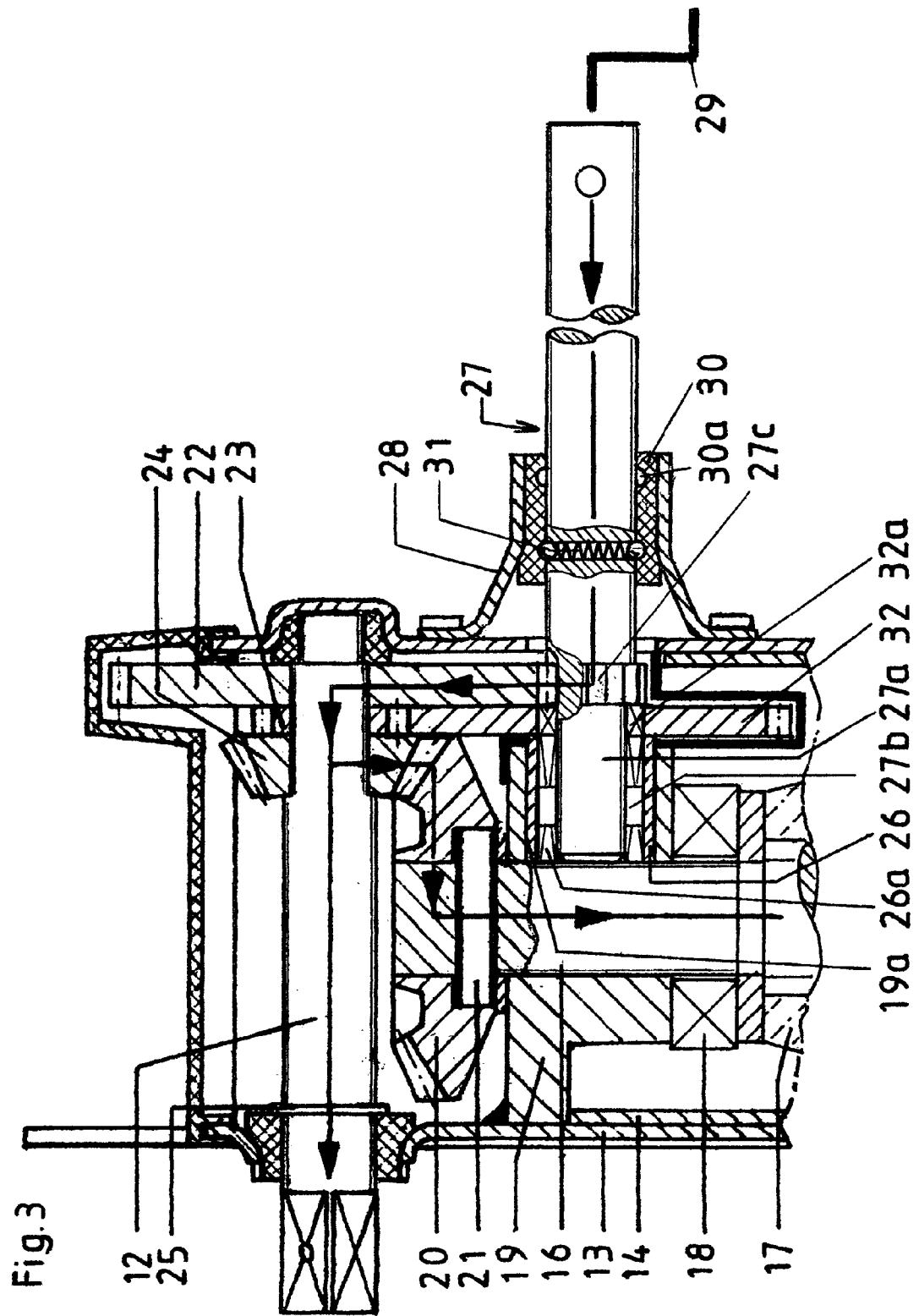
FIG. 3 is a cross-sectional side view of a preferred embodiment of the support shown in FIG. 1 along line A-A in the low-gear operation.

The support 10 shown in FIGS. 1 and 2 is fastened in pairs to the front region of the chassis of a semi-trailer. The supports 10 of each pair are connected to one another by means of a connecting shaft 11 at their transmission output shafts or driven shafts 12, respectively, and in the transport position, they are retracted, i.e. in their shortened state. Prior to uncoupling the semi-trailer from the road tractor, the supports 10 are extended.

The support 10 has a support outer tube or a shaft tube body 13, respectively, and a support inner tube 14 which is arranged therein such that it is slidable in the longitudinal direction. The inner region of the shaft tube body 13 and the support inner tube 14 preferably have square cross-sections. The support 10 is fastened to the semi-trailer frame by means of flange legs 13a located on the shaft tube body 13.

At the lower end of the support inner tube 14 there is fastened a foot 15 for placement onto the ground.

As is shown in FIG. 3, the support 10 has a spindle 16 with a spindle nut or nut 17, respectively. The nut 17 is connected to the support inner tube 14 (not shown). On a disc on the shoulder of the spindle 16 there is seated an axial bearing 18 which is supported on a bearing block or load bearing base 19, respectively, fastened in the shaft tube body 13.

Above the load bearing base 19 there is a bevel gear or crown wheel 20, respectively, which is connected in an unrotatable manner to the spindle 16 by means of a pin 21, which carries the spindle 16. Above the crown wheel 20 there is arranged the driven shaft 12. On the driven shaft 12 there are seated a low-gear gearwheel 22, a fast-gear pinion 23 and a bevel gear or bevel pinion 24, respectively, each in an unrotatable manner. The driven shaft 12 is axially fixed by means of a plug-in lock washer 25.

In the load bearing base 19 the spindle 16 is supported vertically. Furthermore, in a bearing bore 19a of the load bearing base 19 a rotatable sleeve bearing 26 is supported horizontally. The sleeve bearing 26 has at its inside longitudinal grooves 26a. In the sleeve bearing 26 the bearing journal 27a of an axially slidable drive shaft 27 is supported in an unrotatable manner. The bearing journal 27a of the drive shaft 27 has in its front region radially protruding carriers 27b. On the drive shaft 27 there is also provided a toothing as a low-gear pinion 27c. The shank of the drive shaft 27 is supported in a flange bearing 28 which is fastened to the shaft tube body 13.

To the outer end of the drive shaft 27 a hand crank 29 is fastened. The flange bearing 28 has a collar bush 30 with two radial grooves 30a into which a ball stop 31 mounted in the drive shaft 27 can alternately lock.

On the bearing journal 27a there is supported a fast-gear gearwheel 32 which has inner longitudinal grooves 32a which, as regards their cross-section and radial arrangement, correspond to the longitudinal grooves 26a in the sleeve bearing 26.

The transmission functions of the support 10 are as follows:

According to FIG. 3, for the low-gear operation the drive shaft 27 is inserted, wherein the toothing of the low-gear pinion 27c is in mesh with the low-gear gearwheel 22, and the carriers 27b are located within the longitudinal grooves 26a of the sleeve bearing 26. The drive shaft 27 is axially fixed since the ball stop 31 locks into the rear radial groove 30a of the collar bush 30.

When cranking the hand crank 29 on the drive shaft 27, the sleeve bearing 26, caused by the carriers 27b, is also rotated and torque or force is transmitted as is shown by arrow lines in FIG. 3. Force flows from the low-gear pinion 27c to the low-gear gearwheel 22, via the driven shaft 12 to the bevel pinion 24, from there via the crown wheel 20, then to the spindle 16 and the nut 17 which moves the support inner tube 14.

Figure 4:
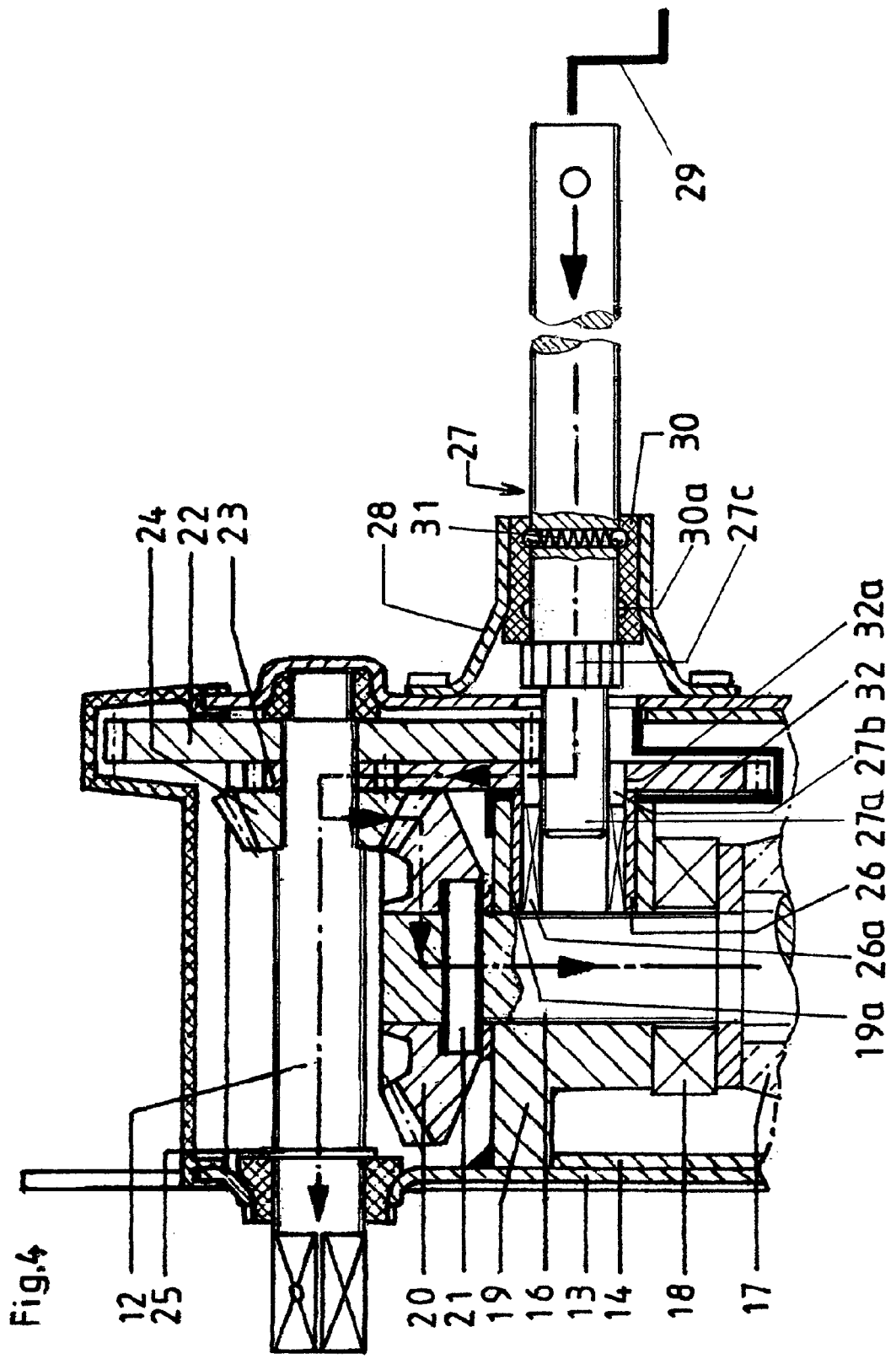
FIG. 4 is a cross-sectional side view of a preferred embodiment of the support shown in FIG. 3 in the fast-gear operation.

According to FIG. 4, in the fast-gear operation, the drive shaft 27 is displaced towards the outside. In this case, the overlapping or meshing of the toothing of the low-gear pinion 27c and the low-gear gearwheel 22 is removed or canceled and the ball stop 31 is locked into the front radial groove 30a of the collar bush 30.

The position of the carriers 27b is such that they mesh both with the longitudinal grooves 32a and the longitudinal grooves 26a and drive the fast-gear gearwheel 32, wherein the sleeve bearing 26 can be rotated simultaneously.

When cranking the hand crank 27, the power flows from the drive shaft 27 via the carriers 27b into the fast-gear gearwheel 32 and from the latter to the fast-gear pinion 23, as is shown in FIG. 4 with dot-dash arrow lines.

The further power flow is the same as described with respect to FIG. 3.

Between the shifting position for the low-gear operation and that for the fast-gear operation of the transmission a freewheel is possible. Here, the low-gear pinion 27c is not in mesh and, as during the low-gear operation, the carriers 27b are in a position within the longitudinal grooves 26a of the sleeve bearing 26.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A height-adjustable support for semi-trailers, comprising:
   a shaft tube body adapted to fastened to a semi-trailer frame;
   a slidable support inner tube arranged in the shaft tube body and having a foot mounted to an end region thereof, wherein the slidable support inner tube is operably coupled to the shaft tube body by a nut located on a spindle which is drivable by a transmission;
   wherein the transmission comprises a low-gear pinion and a fast-gear gearwheel, the low-gear pinion is coupled to a drive shaft and can mesh with a low-gear gearwheel, the fast-gear gearwheel is adapted to drive a fast-gear pinion, and wherein the fast-gear gearwheel is coupled to the drive shaft; and
   wherein the drive shaft is supported in a sleeve bearing such that the drive shaft is fixed for rotation with respect to the sleeve bearing and such that the drive shaft is slidable with respect to the sleeve bearing and wherein the sleeve bearing, is supported rotatably in a load bearing base supporting the spindle.

2. The height-adjustable support according to claim 1 wherein the sleeve bearing in its interior is provided with at least one longitudinal groove that is engaged by a carrier of a bearing journal supporting the drive shaft.

3. The height-adjustable support according to claim 1, wherein the drive shaft is provided with a bearing journal having at least one carrier which protrudes radially.

4. The height adjustable support according to claim 3, wherein the at least one carrier includes two carriers.

5. The height-adjustable support according to claim 3, wherein the carrier is adapted to engage the fast-gear gearwheel after a displacement of the drive shaft.

6. The height-adjustable support according to claim 3, wherein the carrier has a width and an arrangement of the drive shaft such that at the carrier may be simultaneously meshed with the fast-gear gearwheel and the sleeve bearing.

7. The height-adjustable support according to claim 1, wherein the drive shaft is supported in a flange bearing which heightwise is arranged below the driven shaft.

8. The height-adjustable support according to claim 1, wherein at least a portion of the fast-gear gearwheel protrudes into the support inner tube when the support inner tube is in a retracted state.

9. The height-adjustable support according to claim 1, wherein the drive shaft is arranged perpendicularly to the spindle.

10. The height-adjustable support according to claim 1, wherein the fast-gear gearwheel is spaced within the shaft tube body from the front wall of the shaft tube body.

11. The height-adjustable support according to claim 1, wherein the sleeve bearing is supported in a bearing bore of at least a select one of the bearing block and the load bearing base.

\* \* \* \* \*